3,586,607
PROCESS FOR THE RECOVERY AND PURIFICATION OF LYSOZYME

Aurelio Filippo Notarianni and Giuseppe Ghielmetti, Milan, Italy, assignors to SPA-Societa Prodotti Antibiotici S.p.A., Milan, Italy
No Drawing. Filed May 3, 1968, Ser. No. 726,599
Claims priority, application Great Britain, May 9, 1967, 21,434/67
Int. Cl. C07g 7/026
U.S. Cl. 195—66                  6 Claims

ABSTRACT OF THE DISCLOSURE

There is described a process for the purification and recovery of lysozyme, wherein a lysozyme-containing material is contacted with a carboxyalkyl-cellulose, the carboxyalkyl cellulose separated and the lysozyme absorbed thereon subsequently eluted.

BACKGROUND OF THE INVENTION

Lysozyme, which is one of the factors of natural immunity is a mucopolysaccharidase present in all organisms and particularly in the blood, human milk, tears, saliva and in many organs, such as kidneys, lungs, brain and the like as well as in egg white.

Lysozyme is frequently used in the therapy of various diseases of bacterial and viral origin. Furthermore, due to it being a basic polypeptide, lysozyme also has an anti-inflammatory effect. It is also used to stimulate leukopoiesis in various types of leukopenia caused, for example, by cytostatic drugs, benzene and ionising radiations, and as an analgesic for pains caused by neoplasias, neuritis and the like.

The lysozyme molecule, which has a positive electric charge, is formed from 129 amino acids and has a molecular weight of 14,386. Its spatial structure, which has been recently elucidated, is of the globulin type.

Since it has an interesting and wide application in therapy, it is necessary to have large quantities of lysozyme, which is usually obtained from hen's egg white, although the process of the present invention may be also applied to other egg whites or biological materials, such as milk, various tissues and the like.

Lysozyme, which is normally present in egg white in an amount of about 0.5% by weight, should not contain foreign proteins when intended to be used in human therapy, especially when it is to be administered by a parenteral (intramuscular or intravenous) route, in order to avoid secondary reactions.

The methods which have so far been described in literature, such as salting out and subsequent crystallisation in the form of a base or salt (e.g. as the hydrochloride or carbonate), as well as precipitation by solvents or alcohols, do not give satisfactory results.

It is an object of the present invention to provide a new method for the recovery and purification of lysozyme, which gives excellent results from the point of view of purity of the final product, which is found to be immunologically pure.

SUMMARY OF THE INVENTION

According to the present invention, there is provided a process for the purification and recovery of lysozyme wherein a lysozyme-containing material is contacted with a carboxyalkyl-cellulose, the carboxyalkyl-cellulose separated and the lysozyme absorbed thereon subsequently eluted.

DETAILED DESCRIPTION OF THE INVENTION

It is possible, for example, for up to 3 grams of lysozyme to be absorbed by 5 grams of a carboxyalkyl-cellulose under suitable conditions.

Because of its relative cheapness and ready availability, the preferred carboxyalkyl-cellulose for carrying out the new process of the present invention is carboxymethyl-cellulose.

The purification method for lysozyme according to the present invention comprising absorption of the polypeptide on a carboxyalkyl-cellulose, subsequent washing of the absorbent material and elution of the polypeptide by an appropriate buffer solution.

The process is particularly advantageous due to the rapidity and simplicity with which it can be carried out, as well as the degree of purity which can be achieved with it. Consequently, production costs can be reduced. The possibility of using a carboxyalkyl-cellulose as absorbent for lysozyme is particularly advantageous when it is borne in mind that the "specific absorption" (mg. of absorbed protein/mg. absorbent) of these materials is extremely high in comparison with the other absorbent materials which have previously been used for the same purpose.

Carboxyalkyl-celluloses are also able to absorb lysozyme even from egg white, so that the new method according to the present invention is also useful for the preparation of the enzyme directly from egg white. This is an important advantage because it means that the egg white can be used for other purposes, such as for feeding purposes, after the lysozyme has been removed therefrom.

When using egg white or crude lysozyme as starting material, this is preferably first buffered with a buffer solution having a pH above 7 and preferably having a pH of 9–11.5, one such buffer solution being a glycine buffer of pH 10.0. The diluted starting material is then contacted with a carboxyalkyl-cellulose to absorb the lysozyme, after which the absorbent is washed with a buffer solution or water. The lysozyme is then eluted with a dilute salt solution, such as a 2% sodium chloride solution. If desired, the original buffer solution, to which a salt has been added, can be used as eluent. It is to be understood that a large number of different salts can be used but the concentration thereof in the eluent should not be so great as to cause precipitation of the lysozyme.

The lysozyme is then precipitated out of the eluate, preferably after the pH has been adjusted to 9.0–10.0 by increasing the salt concentration therein, for example, by the addition of 5% sodium chloride.

Chemical and microbiological titres and especially immunological tests against rabbit serum sensitised to egg white, show the essential purity of the lysozyme prepared by the new method of the present invention.

The following examples are given for the purpose of illustrating the present invention.

EXAMPLE 1

100 grams lysozyme, which has been purified by crystallisation in the form of the base or the hydrochloride but which still shows a positive reaction to rabbit serum with precipitation curves even at a 0.62% concentration, are dissolved in 20 litres of 0.05 M glycine buffer of pH 10 and contacted with 500 grams carboxymethyl-cellulose buffered with the same buffer.

The carboxymethyl-cellulose is then washed with 4 litres of buffer and thereafter eluted with the same buffer to which 2% sodium chloride has been added. About 13 litres of eluate are collected and the pH thereof adjusted to 9.g–9.6. A further 5% of sodium chloride is then added.

After some time, crystallisation of the lysozyme base begins. It is left in a refrigerator at 4° C. for 70–80 hours and finally filtered off.

The lysozyme recovered represents at least 90% of the starting quantity and it is immunologically pure.

EXAMPLE 2

3 kg. lysozyme are absorbed on 5 kg. carboxymethyl-cellulose in the manner described in Example 1. Similar results were obtained, the yield and purity of the product being not less than in Example 1.

EXAMPLE 3

A 0.5% lysozyme solution in 0.05 M glycine/sodium hydroxide buffer with a pH of 10.0 (3.75 g. glycine/litre) is contacted with carboxymethyl-cellulose, buffered with the same buffer, at a rate of 5 parts of resin to 1 part of lysozyme.

The carboxymethyl-cellulose is then washed with the buffer after which the lysozyme is eluted with the same buffer to which 2% sodium chloride has been added. The pH of the eluate is adjusted to 9.5 and a further 5% of sodium chloride added to bring about precipitation of the lysozyme.

The lysozyme so obtained is immunologically pure.

EXAMPLE 4

1 kg. of egg white is diluted with 3 times its volume of 0.05 M glycine buffer (pH 10) and then contacted with 15 g. carboxymethyl-cellulose which has previously been buffered with the same buffer. The carboxymethyl-cellulose is thereafter separated and the lysozyme eluted therefrom in the manner described in Example 1.

EXAMPLE 5

The process of Example 4 is repeated but without dilution of the egg white with the buffer solution. The egg white remaining after separation of the carboxymethyl-cellulose can be used for any desired purpose, such as for the preparation of foodstuffs.

We claim:
1. A process for the production of immunologically pure lysozyme, wherein egg white is contacted with a carboxyalkyl-cellulose at a pH of more than 7, the carboxyalkyl-cellulose is separated and the lysozyme adsorbed thereon is subsequently eluted.
2. A process according to claim 1, wherein the carboxyalkyl-cellulose used is carboxymethyl-cellulose.
3. A process according to claim 1, wherein the lysozyme-containing starting material is buffered to a pH of 9–11.5.
4. A process according to claim 1, wherein the carboxyalkyl-cellulose, after absorption of the lysozyme, is washed with a member selected from buffer solutions and water before elution of the lysozyme.
5. A process according to claim 4, wherein the lysozyme is eluted from the carboxyalkyl-cellulose with a member selected from dilute salt solutions and buffer solutions to which a salt has been added.
6. A process according to claim 1, wherein the lysozyme is precipitated from the eluate by salting out.

References Cited

UNITED STATES PATENTS 3,419,471   12/1968   Matsuoka et al. _____ 195—66

OTHER REFERENCES

Jolles: Angew. Chem. Internat. edition, vol. 3 (1964), pp. 28–36.

LIONEL M. SHAPIRO, Primary Examiner

U.S. Cl. X.R.

424—177